United States Patent
Gridnev et al.

(10) Patent No.: US 7,740,699 B2
(45) Date of Patent: Jun. 22, 2010

(54) ORTHOFORMATE-PROTECTED POLYOLS

(75) Inventors: Alexei A. Gridnev, Wilmington, DE (US); Thomas Robert Darling, Wilmington, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 116 days.

(21) Appl. No.: 11/906,907

(22) Filed: Oct. 4, 2007

(65) Prior Publication Data
US 2009/0011133 A1 Jan. 8, 2009

Related U.S. Application Data

(60) Provisional application No. 60/849,724, filed on Oct. 5, 2006.

(51) Int. Cl.
*C04B 28/36* (2006.01)
(52) U.S. Cl. .............................. 106/287.23; 252/183.11; 525/410; 525/399; 528/425
(58) Field of Classification Search ........................ None
See application file for complete search history.

(56) References Cited

U.S. PATENT DOCUMENTS

| 3,644,423 | A | * | 2/1972 | Roswell et al. | ............. 549/448 |
| 4,136,252 | A | * | 1/1979 | Capozza | ..................... 528/403 |
| 4,311,782 | A | * | 1/1982 | Buhr et al. | ............... 430/270.1 |
| 4,368,314 | A | * | 1/1983 | Endo et al. | ..................... 528/89 |
| 5,013,770 | A | * | 5/1991 | Carpenter et al. | ........... 523/213 |
| 5,824,343 | A | * | 10/1998 | Ng et al. | ..................... 424/486 |

FOREIGN PATENT DOCUMENTS

EP 1225172 A1 * 7/2002

* cited by examiner

*Primary Examiner*—Michael Barr
*Assistant Examiner*—Robert S Walters, Jr.
(74) *Attorney, Agent, or Firm*—Gann G Xu

(57) ABSTRACT

Disclosed herein are coating compositions comprising a blocked polyol having a first hydroxyl group at position 1 carbon atom and a second hydroxyl group at position 2 or 3 carbon atom, wherein both the first and the second hydroxyl groups are blocked by a single hydrolyzable orthoformate group; and a polyisocyanate compound. Methods of producing and using said coating compositions are also disclosed.

4 Claims, No Drawings

ORTHOFORMATE-PROTECTED POLYOLS

CROSS-REFERENCE TO RELATED APPLICATION

This application claims priority under 35 U.S.C. §119 from U.S. Provisional Application Ser. No. 60/849,724 (filed Oct. 5, 2006), the disclosure of which is incorporated by reference herein for all purposes as if fully set forth.

FIELD OF THE INVENTION

The disclosure herein relates to the protection of hydroxyl groups in polyols useful in the production of low volatile organic compound content, long pot life coatings using polyisocyanates for crosslinking.

BACKGROUND OF THE INVENTION

A key to refinish coatings is the ability to deliver a refinished vehicle to the customer as quickly as possible with a maximum level of appearance. The consumer wants to have a good-looking, repaired vehicle as quickly as possible to minimize the inconvenience of being without a vehicle. The repair shop wants to maximize the utilization of his capital investment and minimize the overall labor and cost in repairing a vehicle. Thus, productivity in the overall repair process and good appearance is critical.

Additionally, pressures exist worldwide to develop low volatile organic compounds ("VOC"), that is, environmentally friendly coating systems. One key to resolving these issues is through the dramatic reduction or elimination of solvents used in coatings. These new, low VOC coatings need to meet key customer attributes including productivity, appearance, and film properties while being robust, user-friendly systems.

Currently, the automotive refinish market is comprised mostly of two-pack coating compositions having two components stored in separate containers capable of curing at ambient conditions into crosslinked, three-dimensional, thin films. These two-pack coating compositions are predominantly solvent based and use hydroxyl/isocyanate curing. One component of the two-pack coatings contains crosslinkable functional groups, such as hydroxyl groups; the other component contains crosslinking groups, such as isocyanate groups. The two components are mixed just prior to spraying on a substrate, such as a vehicle body. These two-pack coating compositions need to remain at a low enough viscosity to allow for spraying over an extended timeframe and then, after spraying, require rapid curing to a three-dimensional network on the substrate, such as a vehicle body to maximize productivity and physical properties.

In repairing damage such as a dent to a vehicle body, the original coating in and around the damage is typically sanded or ground out by mechanical means. Sometimes the original coating is stripped off from a portion or off the entire vehicle body to expose the bare metal underneath. After repairing the damage, the repaired surface is coated, preferably with low VOC coating compositions, typically in portable or permanent low cost painting enclosures vented to atmosphere to remove the organic solvents from the freshly applied paint coatings in a safe manner from the standpoint of operator health and explosion hazard. Typically, the drying and curing of the freshly applied paint coatings takes place within these enclosures. Furthermore, the foregoing drying and curing steps take place within the enclosure to prevent the wet paint coatings from collecting dirt in the air or other contaminants.

As these paint enclosures take up significant floor space of typical small vehicle body shops, these shops prefer to dry and cure these paint coatings as fast as possible. One way to accelerate drying and curing of the freshly applied paint coatings is to provide heat sources such as conventional heat lamps, infrared radiation heaters, or hot air to the enclosure. However, addition of the heat sources increases not only operational costs, but also the energy consumption of the shops and therefore is not desired by the small vehicle body shops. Therefore, to provide more cost and energy effective utilization of shop floor space and to minimize fire hazards resulting from wet coatings from solvent based coating compositions, there exists a continuing need for fast curing coating formulations that cure under ambient conditions while still providing outstanding performance characteristics, particularly chip resistance, mar-resistance, durability, and appearance.

A key aspect of the productivity in refinish coatings is the ability for physical dry. High productivity coatings need to be able to dry to the touch very rapidly to allow for application of subsequent coats.

A commonly owned, co-pending Published U.S. Patent Application No. 2005/0209433 discloses a coating composition wherein orthoester groups block the crosslinkable hydroxyl groups of the poly(meth)acrylate wherein the orthoester groups can be removed through hydrolysis to generate de-blocked crosslinkable hydroxyl groups. The de-blocked crosslinkable hydroxyl groups then react with crosslinking compounds having isocyanate crosslinking groups. Published U.S. Patent Application No. 2005/0209433 further discloses a process for coating substrates wherein a clearcoat comprising the aforementioned coating composition is coated over a basecoat. A process for blocking the hydroxyl groups of a poly(meth)acrylate compound through reaction with an orthoester compound is also disclosed.

Published U.S. Patent Application No. 2005/0165199 discloses a process for preparing polymers containing polyortho ester groups and optionally isocyanate groups by reacting A) and B) where A) is a polyortho ester containing at least one isocyanate-reactive crosslinkable group prepared by reacting at least one or more acyclic orthoesters with low molecular weight polyols having a functionality of 4-8 and a number-average molecular weight of 80-500 g/mol and B) is at least one polyisocyanate having at least one crosslinking isocyanate group. The polymers obtained from the process can be used to produce coating compositions, adhesives and/or sealers. The coating compositions can include one or more of the above-described polymers, optionally polyisocyanates, catalysts, and optionally auxiliaries and additives.

It is desirable to improve physical dry and long pot life through the use of novel polyols with protected hydroxyl groups. The coatings disclosed herein are stable under anhydrous conditions but become active, or de-blocked, after being applied to a substrate and exposed to atmosphere, wherein the absorption of atmospheric moisture will de-block the hydroxyl groups. The de-blocked hydroxyl groups then quickly react with the isocyanate crosslinking groups in the coating composition to develop a three-dimensional network, and very rapid film formation occurs.

SUMMARY OF THE INVENTION

One aspect of the invention is for a coating composition comprising: (a) a polyol having a first hydroxyl group at position 1 carbon atom and a second hydroxyl group at position 2 carbon atom, wherein both the first and the second hydroxyl groups are blocked by a single hydrolyzable orthoformate group; and (b) one or more polyisocyanate compounds.

Another aspect of the invention is for a process for producing a curable coating composition comprising the steps of: (a) providing a coating composition comprising: (i) a blocked polyol having a first hydroxyl group at position 1 carbon atom and a second hydroxyl group at position 2 carbon atom, wherein both the first and the second hydroxyl groups are blocked by a single hydrolyzable orthoformate group; and (ii) one or more polyisocyanate compounds; and (b) hydrolyzing the blocked polyol to produce a de-blocked polyol having de-blocked hydroxyl groups that can react with the polyisocyanate compound of the coating composition to form crosslinks.

An additional aspect of the invention is for a process for coating a substrate comprising the steps of: (A) providing a coating composition comprising: (i) a blocked polyol having a first hydroxyl group at position 1 carbon atom and a second hydroxyl group at position 2 carbon atom, wherein both the first and the second hydroxyl groups are blocked by a single hydrolyzable orthoformate group; and (ii) one or more polyisocyanate compounds; (B) hydrolyzing the blocked polyol to produce a curable coating composition having de-blocked hydroxyl groups that can react with the polyisocyanate compound of the coating composition to form crosslinks; (C) applying a layer of the curable coating composition over the substrate; and (D) curing the layer of the curable coating composition on the substrate.

A yet another aspect of the invention is for a process for coating a substrate comprising the steps of: (a) providing a hydroxyl component comprising a blocked polyol having a first hydroxyl group at position 1 carbon atom and a second hydroxyl group at position 2 or 3 carbon atom, wherein both the first and the second hydroxyl groups are blocked by a single hydrolyzable orthoformate group; (b) hydrolyzing the blocked polyol to produce a de-blocked polyol having de-blocked hydroxyl groups; (c) contacting the de-blocked polyol with a first polyisocyanate compound to produce a de-blocked polyol intermediate; (d) contacting the de-blocked polyol intermediate with a second polyisocyanate compound to form a curable coating composition; (e) applying the curable coating composition over the substrate to form a coating layer; and (f) curing the coating layer on the substrate.

Other objects and advantages will become apparent to those skilled in the art upon reference to the detailed description that hereinafter follows.

DETAILED DESCRIPTION OF THE INVENTION

Applicants specifically incorporate the entire content of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

In the context of this disclosure, a number of terms shall be utilized.

The term "(meth)acrylate" denotes both acrylate and methacrylate.

The term "low VOC coating composition" means a coating composition that includes the range of from 0.1 kilograms (1.0 pounds per gallon) to 0.72 kilograms (6.0 pounds per gallon), preferably 0.3 kilograms (2.6 pounds per gallon) to 0.6 kilograms (5.0 pounds per gallon), and more preferably 0.34 kilograms (2.8 pounds per gallon) to 0.53 kilograms (4.4 pounds per gallon) of the solvent per liter of the coating composition. All VOCs are determined under the procedure provided in ASTM D3960.

By "blocked" is meant forming hydrolyzable esters through reaction between a hydroxyl group of a polyol and one orthoformate group.

One embodiment relates to a coating composition comprising a polyol having a first hydroxyl group at position 1 carbon atom and a second hydroxyl group at position 2 carbon atom, wherein both the first and the second hydroxyl groups are blocked by a single hydrolyzable orthoformate group and a polyisocyanate compound. Blocked polyols are produced by an esterification reaction wherein a polyol having hydroxyl groups in the position 1 and 2 carbon atoms is reacted with a single orthoformate compound to form orthoformate protected 1,2 polyol. The esterification reaction results in a cyclic compound wherein both hydroxyl groups have been blocked by one orthoformate group. The esterification reaction can be done in the presence or in the absence of acid catalyst. When additional hydroxyl groups are present in the polyol, such as a third hydroxyl group at position 3 carbon atom of the polyol, the orthoformate compound can react with the hydroxyl groups to form a mixed reaction products, such as orthoformate protected 1,2 or 1,3 polyols. Orthoformate protected 1,2 polyol is preferred in this invention. When needed for use in a coating composition, the blocked polyol is de-blocked by hydrolyzing the orthoformate group with water, either prior to or simultaneous with the addition of the polyisocyanate compound. The de-blocked hydroxyl groups of the polyol can freely react with the polyisocyanate compound to produce coating compositions by any method known to one of ordinary skill in the art. The de-blocked hydroxyl groups of the polyol can also react with suitable polyisocyanate compounds to form a de-blocked polyol intermediate that are chain extended by chain extend agents such as polyisocyanate compounds having at least two isocyanate groups. Suitable polyisocyanate compounds for the chain extend agents can be diisocyanate compounds. One example of such diisocyanate compounds is isophorone diisocyanate. In one embodiment, an orthoformate protected 1,2 polyol is hydrolyzed with water and reacts with a first polyisocyanate such as a diisocyanate to chain extend, and subsequently reacts with a second polyisocyanate such as a trimer of diisocyanate to form crosslink. In another embodiment, an orthoformate protected 1,2 polyol is hydrolyzed with water and reacts directly with a trimer of diisocyanate to form crosslink.

In one embodiment, the polyol has the formula:

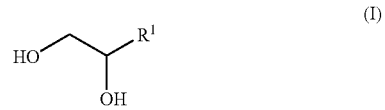

(I)

wherein $R^1$ is $C_1$ to $C_{10}$ alkyl, $C_1$ to $C_{10}$ hydroxyalkyl, $C_1$ to $C_{10}$ alkyl ester, $C_1$ to $C_{10}$ alkyl ether, $C_1$ to $C_{10}$ hydroxyalkyl ether, or hydroxycarbamoyloxy. $C_1$ to $C_4$ compounds are preferred.

The blocking reaction is thermal, which means performed by heat without the need for a catalyst. A catalyst may be used, however, if desired. To block the hydroxyl groups of a polyol, the polyol is heated with an excess of an orthoformate compound. Preferably, the orthoformate compound has the following chemical structure (Formula II):

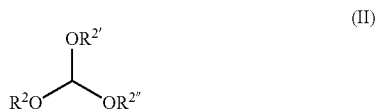

wherein $R^2$, $R^{2'}$ and $R^{2''}$ can be, independently, alkyls of 1 through 10 carbon atoms, preferably alkyls of 1 through 4 carbon atoms, and further preferably alkyls with 1 through 2 carbon atoms.

The thermal reaction preferably occurs in the temperature range of about 70° C. to about 180° C., preferably about 80° C. to about 140° C., and more preferably about 90° C. to about 100° C. In the presence of a catalyst, the thermal reaction preferably occurs in the temperature range of about 0° C. to about 50° C., preferably about 10° C. to about 40° C., more preferably about 18° C. to about 25° C. The hydroxyl groups are blocked, for example, by the following reaction:

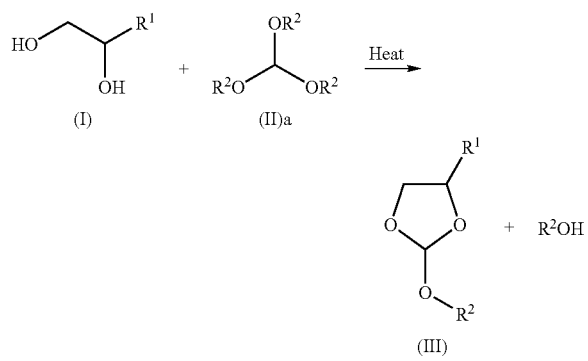

wherein $R^1$ is $C_1$ to $C_{10}$ alkyl, $C_1$ to $C_{10}$ hydroxyalkyl, $C_1$ to $C_{10}$ alkyl ester, $C_1$ to $C_{10}$ alkyl ether, $C_1$ to $C_{10}$ hydroxyalkyl ether, or hydroxycarbamoyloxy; and $R^2$ is alkyl of 1 through 10 carbon atoms. In this example, same $R^2$ groups are shown in the formula (II) a for simplicity.

During the reaction above, monocyclic orthoformate can undergo oligomerization to produce dimers, trimers, and higher oligomers, all of which are useful in the coating compositions disclosed herein. The degree of oligomerization can be controlled by temperature and time; the higher the reaction temperature and the longer the reaction time, the higher the average molecular weight of the resulting protected polyol/hydrolyzable orthoformate oligomer. Oligomerization of compound (III) produces an oligomer of the formula:

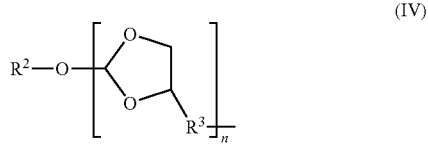

wherein n is from 1 through 10, preferably from 1 through 5, and even more preferably from 1 through 2; $R^2$ is alkyl of 1 through 10 carbon atoms; $R^3$ is oxy, $C_1$ to $C_{10}$ alkyl, $C_1$ to $C_{10}$ alkoxy, $C_1$ to $C_{10}$ alkyl ester, or —O—NH—COO—. The oligomerization may produce a mixture of the oligomers of the formula IV, wherein n is from 1 through 10. For a certain mixture of the oligomers, n can have an average value ranging from 1.01 to 10. It is preferred that average value of n is in a range from 1.01 to 5.00, further preferred in a range from 1.5 to 2.5. In one embodiment, the number average molecular weight $M_n$ of the oligomer is in a range from 100 to 800. All molecular weights referred to herein are determined by gel permeation chromatography ("GPC") using a polystyrene standard.

Coating compositions comprising mixtures of compounds (III) and (IV) are contemplated in the present disclosure.

Blocking the hydroxyl groups of the polyol compound can reduce the viscosity of the coating composition, thus allowing for the preparation of higher solids, lower VOC coating compositions. If necessary, the viscosity of the blocked polyol can be adjusted using, for example, ethyl acetate. Further, coating compositions comprising the blocked polyols have enhanced pot life under anhydrous conditions.

The polyisocyanate compound of the coating composition includes one or more isocyanate, diisocyanate, triisocyanate, diisocyanate trimer compounds having at least two isocyanate groups. Any conventional aromatic, aliphatic, cycloaliphatic, isocyanates, trifunctional isocyanates, and isocyanate functional adducts of a polyol and a diisocyanate can be used. The polyisocyanate compounds can be used as a chain extend agent or a crosslinking agent.

Typically useful diisocyanates are 1,6-hexamethylene diisocyanate, isophorone diisocyanate, 4,4'-biphenylene diisocyanate, toluene diisocyanate, bis cyclohexyl diisocyanate, tetramethylene xylene diisocyanate, ethyl ethylene diisocyanate, 2,3-dimethyl ethylene diisocyanate, 1-methyltrimethylene diisocyanate, 1,3-cyclopentylene diisocyanate, 1,4-cyclohexylene diisocyanate, 1,3-phenylene diisocyanate, 1,5-naphthalene diisocyanate, bis-(4-isocyanatocyclohexyl)-methane, and 4,4'-diisocyanatodiphenyl ether.

Typical trifunctional isocyanates include triphenylmethane triisocyanate, 1,3,5-benzene triisocyanate, and 2,4,6-toluene triisocyanate. Trimers of diisocyanates also can be used, such as the trimer of hexamethylene diisocyanate, which is supplied by Bayer Corp., Pittsburgh, Pa., under the trademark Desmodur® N 3300A. Other suitable polyisocyanates from Bayer Corp. include Desmodur® N 3390A BA/SN and Z 4470BA polyisocyanates. Trimers of diisocyantes are preferred crosslinking agents.

The relative amount of crosslinking agent used in the coating composition is adjusted to provide a molar equivalent ratio of isocyanate group (NCO)/hydroxyl(OH) in the range of from about 0.5 to about 5, preferably in the range of from about 0.7 to about 3, and more preferably in the range of from about 0.85 to about 2.

Mixtures of polyisocyanate compounds are also suitable for use in the coating compositions disclosed herein. For example, different isocyanates such as isophorone diisocyanate and 1,6-hexamethylene diisocyanate can be used in combination. Derivatives of isophorone diisocyanate and 1,6-hexamethylene diisocyanate, such as trimers of isophorone diisocyanate and trimers of 1,6-hexamethylene diisocyanate, can be used alone or in combination.

In one embodiment, the hydrolyzable orthoformate group has the following chemical structure:

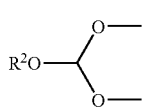

(V)

wherein $R^2$ is alkyl of 1 through 10 carbon atoms.

Hydrolyzing the protective group leads to exposure of hydroxyl groups available for crosslinking. Hydrolysis of a blocked polyol disclosed herein produces a de-blocked compound having at least one hydroxyl group available for crosslinking with a polyisocyanate compound. An exemplary hydrolysis reaction of a five-member ring protected polyol is shown below:

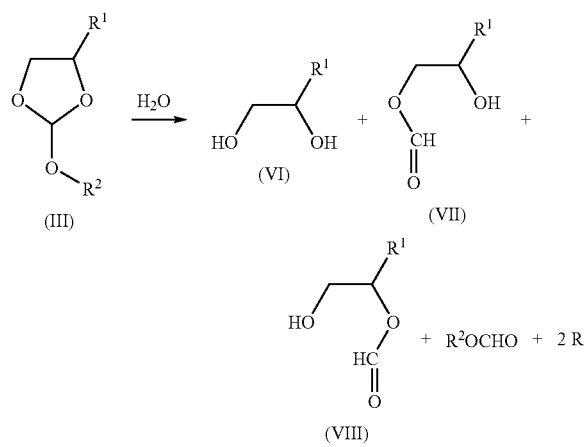

wherein $R^1$ is $C_1$ to $C_{10}$ alkyl, $C_1$ to $C_{10}$ hydroxyalkyl, $C_1$ to $C_{10}$ alkyl ester, $C_1$ to $C_{10}$ alkyl ether, $C_1$ to $C_{10}$ hydroxyalkyl ether, or hydroxycarbamoyloxy; and $R^2$ is alkyl of 1 through 10 carbon atoms. Compounds (VI), (VII), and (VIII) are predicted to be produced in a 1:1:1 ratio. Thus, the average number of hydroxyl groups released after de-blocking of a protected polyol is 1.3.

Hydrolysis can occur in water, optionally in the presence of an acid catalyst. Suitable acids, for example, include acetic acids and the like, phosphorous and phosphoric acids and their esters, hydrochloric acid, perchloric acid, hydrobromic acid, sulfuric acid and its half-esters, sulfonic acids like dodecylbenzenesulfonic acid, and compounds that generate acids upon hydrolysis such as, for example, $POCl_3$, $SOCl_2$, and $PCl_5$.

The hydrolysis reaction can occur before or concurrently with the addition of chain extend agents or crosslinking agents. Preferably, the blocked polyols are hydrolyzed, and the hydroxyl groups thus de-blocked, concurrently with the addition of chain extend agents or crosslinking agents. The water may be introduced in a variety of ways. For example, especially in the case of a coating, the water may be introduced into the coating by absorption from the atmosphere. Alternatively, water may be introduced at a spray gun head while the coating is spray applied to a substrate.

As described above, the coating composition having the blocked polyols and the polyisocyanates are stable under anhydrous conditions. The blocked polyols can be de-blocked by hydrolysis to form a curable coating composition. The curable coating composition is produced by hydrolyzing the blocked polyol in the presence of water. Hydrolysis can also occur when the coating composition is in contact with moisture in the air. A simple process to hydrolyze the coating blocked polyol is to apply a thin layer of the coating composition on a substrate and expose the layer to the moisture in the air.

The coating composition is suitable for use as a clear or pigmented composition. The coating composition can be used as a monocoat, a basecoat, or a primer.

The coating composition can include additional components such as solvents, catalysts, pigments, fillers, and conventional additives.

Some of the suitable solvents include aromatic hydrocarbons, such as petroleum naphtha or xylenes; esters, such as, butyl acetate, t-butyl acetate, isobutyl acetate or hexyl acetate; and glycol ether esters, such as propylene glycol monomethyl ether acetate. The amount of organic solvent added depends upon the desired solids level as well as the desired level of VOC of the composition. If desired, the organic solvent may be added to both the components of the coating composition.

The coating composition preferably includes a catalytic amount of a catalyst for accelerating the curing process. Generally, in the range of about 0.001% to about 5%, preferably in the range of from about 0.002% to about 3%, more preferably in the range of from about 0.005% to about 1.5% of the catalyst is utilized, all in weight percent based on the total weight of the crosslinkable and crosslinking component solids. A wide variety of catalysts can be used, such as tin compounds, including dibutyl tin dilaurate and dibutyl tin diacetate, and tertiary amines such as triethylenediamine. These catalysts can be used alone or in conjunction with carboxylic acids, such as acetic acid. One of the commercially available catalysts, sold under the trademark Fastcat® 4202 dibutyl tin dilaurate (Elf-Atochem North America, Inc., Philadelphia, Pa.), is particularly suitable.

The coating composition can contain one or more coloring or special effect producing pigments. Examples of inorganic or organic coloring pigments include titanium dioxide, micronized titanium dioxide, iron oxide pigments, carbon black, azo pigments, phthalocyanine pigments, quinacridone pigments, and pyrrolopyrrol pigments. Examples of special effect producing pigments include aluminum flake, copper bronze flake, and other metal flakes; interference pigments, such as metal oxide coated metal pigments, for example, titanium dioxide coated or mixed oxide coated aluminum, coated mica such as, for example, titanium dioxide coated mica and graphite special effect pigments.

Examples of fillers include silicon dioxide, aluminium silicate, barium sulfate, and talcum.

The coating composition may also include conventional additives such as wetting agents; leveling and flow control agents, for example, BYK® 320 and 325 (high molecular weight polyacrylates; BYK-Chemie USA Inc., Wallingford, Conn.), BYK® 347 (polyether-modified siloxane), and BYK® 306 (polyether-modified dimethylpolysiloxane); rheology control agents such as fumed silica; defoamers; surfactants; and emulsifiers to help stabilize the composition. Other additives that tend to improve mar resistance can be added, such as silsesquioxanes and other silicate-based micro-particles. Such additional additives will, of course, depend on the intended use of the coating composition. Any additives that would adversely affect the clarity of the cured coating will not be included when the composition is used as a clearcoat. The foregoing additives may be added to either component or both depending upon the intended use of the coating composition.

To improve weatherability of the coating, from about 0.1 to about 5 weight percent, preferably from about 0.5 to about 2.5 weight percent, and more preferably from about 1 to about 2 weight percent of ultraviolet light stabilizers screeners, quenchers, and antioxidants can be added to the composition, the percentages being based on the total weight of the crosslinkable and crosslinking components solids. Typical ultraviolet light screeners and stabilizers include the following: benzophenones such as hydroxy dodecycloxy benzophenone, 2,4-dihydroxy benzophenone, and hydroxy benzophenones containing sulfonic acid groups; benzoates such as dibenzoate of diphenylol propane and tertiary butyl benzoate of diphenylol propane; triazines such as 3,5-dialkyl-4-hydroxyphenyl derivatives of triazine and sulfur containing derivatives of dialkyl-4-hydroxy phenyl triazine and hydroxy phenyl-1,3,5-triazine; triazoles such as 2-phenyl-4-(2,2'-dihydroxy benzoyl)-triazole and substituted benzotriazoles such as hydroxy-phenyltriazole; hindered amines such as bis(1,2,2,6,6-entamethyl-4-piperidinyl sebacate) and di[4(2,2,6,6-tetramethyl piperidinyl)]sebacate; and any mixtures of any of the above.

In a further alternative embodiment, coatings of this invention can comprise a conventional acrylic polymer, a polyester, a reactive oligomer, a dispersed acrylic polymer, an aldimine or ketimine, and/or a polyaspartic ester.

The conventional acrylic polymer suitable for use in the present invention can have a GPC $M_w$ exceeding 5,000, preferably in the range of from 5,000 to 20,000, more preferably in the range of 6,000 to 20,000, and most preferably in the range of from 8,000 to 12,000. The $T_g$ of the acrylic polymer varies in the range of from 0° C. to 100° C., preferably in the range of from 30° C. to 80° C.

The acrylic polymer suitable for use in the present invention can be conventionally polymerized from typical monomers, such as alkyl(meth)acrylates having alkyl carbon atoms in the range of from 1 to 18, preferably in the range of from 1 to 12, and styrene and functional monomers such as hydroxyethyl acrylate and hydroxyethyl methacrylate.

The polyester suitable for use in the present invention can have a GPC $M_w$ exceeding 1,500, preferably in the range of from 1,500 to 100,000, more preferably in the range of 2,000 to 50,000, still more preferably in the range of 2,000 to 8,000, and most preferably in the range of from 2,000 to 5,000. The $T_g$ of the polyester varies in the range of from −50° C. to 100° C., preferably in the range of from −20° C. to 50° C.

Suitable polyesters can be conventionally polymerized from suitable polyacids, including cycloaliphatic polycarboxylic acids, and suitable polyols, which include polyhydric alcohols. Examples of suitable cycloaliphatic polycarboxylic acids are tetrahydrophthalic acid, hexahydrophthalic acid, 1,2-cyclohexanedicarboxylic acid, 1,3-cyclohexanedicarboxylic acid, 1,4-cyclohexanedicarboxylic acid, 4-methylhexahydrophthalic acid, endomethylenetetrahydrophthalic acid, tricyclodecanedicarboxylic acid, endoethylenehexahydrophthalic acid, camphoric acid, cyclohexanetetracarboxylic acid, and cyclobutanetetracarboxylic acid. The cycloaliphatic polycarboxylic acids can be used not only in their cis but also in their trans form and as a mixture of both forms. Examples of suitable polycarboxylic acids, which, if desired, can be used together with the cycloaliphatic polycarboxylic acids, are aromatic and aliphatic polycarboxylic acids, such as, for example, phthalic acid, isophthalic acid, terephthalic acid, halogenophthalic acids, such as, tetrachloro- or tetrabromophthalic acid, adipic acid, glutaric acid, azelaic acid, sebacic acid, fumaric acid, maleic acid, trimellitic acid, and pyromellitic acid.

Suitable polyhydric alcohols include ethylene glycol, propanediols, butanediols, hexanediols, neopentylglycol, diethylene glycol, cyclohexanediol, cyclohexanedimethanol, trimethylpentanediol, ethylbutylpropanediol, ditrimethylolpropane, trimethylolethane, trimethylolpropane, glycerol, pentaerythritol, dipentaerythritol, tris(hydroxyethyl) isocyanate, polyethylene glycol, and polypropylene glycol. If desired, monohydric alcohols, such as, for example, butanol, octanol, lauryl alcohol, ethoxylated, or propoxylated phenols may also be included along with polyhydric alcohols. The details of polyester suitable for use in the present invention are further provided in the U.S. Pat. No. 5,326,820, incorporated herein by reference. One commercially available polyester, which is particularly preferred, is SCD®-1040 polyester, which is supplied by Etna Products Inc., Chagrin Falls, Ohio.

Useful reactive oligomers are covered in U.S. Pat. No. 6,221,494, incorporated herein by reference. Non-alicyclic (linear or aromatic) oligomers can also be used, if desired. Such non-alicyclic-oligomers can be made by using non-alicyclic anhydrides, such as succinic or phthalic anhydrides, or mixtures thereof. Caprolactone oligomers described in U.S. Pat. No. 5,286,782, incorporated herein by reference, can also be used.

Typical useful dispersed acrylic polymers are prepared by dispersion polymerizing at least one vinyl monomer in the presence of a polymer dispersion stabilizer and an organic solvent. The polymer dispersion stabilizer may be any of the known stabilizers used commonly in the field of dispersed acrylic polymers. These dispersed acrylic polymers are covered in U.S. Pat. No. 5,763,528, incorporated herein by reference.

Suitable aldimines may be prepared from aldehydes such as acetaldehyde, formaldehyde, propionaldehyde, isobutyraldehyde, n-butyraldehyde, heptaldehyde, and cyclohexyl aldehydes by reaction with amine. Representative amines that may be used to form the aldimine include ethylene diamine, ethylene triamine, propylene diamine, tetramethylene diamine, 1,6-hexamethylene diamine, bis(6-aminohexyl) ether, tricyclodecane diamine, N,N'-dimethyldiethyltriamine, cyclohexyl-1,2,4-triamine, cyclohexyl-1,2,4,5-tetraamine, 3,4,5-triaminopyran, 3,4-diaminofuran, and cycloaliphatic diamines.

Suitable polyaspartic esters are typically prepared by the reaction of diamines such as isophorone diamine with dialkyl maleates such as diethyl maleate.

The foregoing polyaspartic ester and selected aldimines are supplied commercially under the trademark Desmophen® amine co-reactants by Bayer Corp.

Suitable ketimines are typically prepared by the reaction of ketones with amines. Representative ketones, which may be used to form the ketimine, include acetone, methyl ethyl ketone, methyl isopropyl ketone, methyl isobutyl ketone, diethyl ketone, benzyl methylketone, diisopropyl ketone, cyclopentanone, and cyclohexanone. Representative amines which may be used to form the ketimine include ethylene diamine, ethylene triamine, propylene diamine, tetramethylene diamine, 1,6-hexamethylene diamine, bis(6-aminohexyl) ether, tricyclodecane diamine, N,N'-dimethyldiethyltriamine, cyclohexyl-1,2,4-triamine, cyclohexyl-1,2,4,5-tetraamine, 3,4,5-triaminopyran, 3,4-diaminofuran, and cycloaliphatic diamines. Preparation and other suitable imines are shown in U.S. Pat. No. 6,297,320, incorporated herein by reference.

The coating composition can be supplied in the form of a two-pack coating composition. Generally, the crosslinkable component and the crosslinking component are mixed, typically just prior to application to form a pot mix. The mixing can take place though a conventional mixing nozzle or separately in a container. A layer of the pot mix generally having a thickness in the range of 15 μm to 200 μm is applied over a substrate, such as an automotive body or an automotive body that has precoated layers, such as electrocoat primer. The foregoing application step can be conventionally accomplished by spraying, electrostatic spraying, roller coating, dipping, or brushing the pot mix over the substrate. The layer after application is typically dried to reduce the solvent content from the layer and then cured at a temperature ranging from ambient to about 160° C. (320° F.). Under typical automotive original equipment manufacturer ("OEM") applications, the dried layer of the composition can be typically cured at elevated temperatures ranging from about 60° C. to about 160° C. in about 10 to 60 minutes. Preferably, for automotive refinish applications, curing can take place at about ambient to about 60° C., and for heavy duty truck body applications, curing can take place at about 60° C. to about 80° C. The cure under ambient conditions occurs in about 30 minutes to 24 hours, generally in about 30 minutes to 4 hours to form a coating on the substrate having the desired coating properties. It is further understood that the actual drying and curing time can depend upon the thickness of the applied layer, the cure temperature, humidity, and on any additional mechanical aids, such as fans, that assist in continuously flowing air over the coated substrate. It is understood that actual curing temperature would vary depending upon the catalyst and the amount thereof, thickness of the layer being cured, and the amount of the crosslinking component utilized.

Suitable substrates include automobile bodies; any and all items manufactured and painted by automobile sub-suppliers; frame rails; commercial trucks and truck bodies, including but not limited to beverage delivery vehicle bodies, utility vehicle bodies, ready mix concrete delivery vehicle bodies, waste hauling vehicle bodies, and fire and emergency vehicle bodies, as well as any potential attachments or components to such truck bodies, buses, farm, and construction equipment; truck caps and covers; commercial trailers; consumer trailers; recreational vehicles, including but not limited to, motor homes, campers, conversion vans, vans, pleasure vehicles, pleasure craft snow mobiles, all terrain vehicles, personal watercraft, motorcycles, boats, and aircraft. The substrate further includes industrial and commercial new construction and maintenance thereof; cement and wood floors; walls of commercial and residential structures, such office buildings and homes; amusement park equipment; concrete surfaces, such as parking lots and drive ways; asphalt and concrete road surface; wood substrates; marine vessel surfaces; outdoor structures, such as bridges; towers; coil coating; railroad cars; printed circuit boards; machinery; OEM tools; signage; fiberglass structures; sporting goods; and sporting equipment.

The substrate can be pre-coated with one or more layers of a primer, a surfacer, a basecoat, or a combination thereof. The coating composition of this invention can be applied directly to the substrate or to the pre-coated substrate. A substrate pre-coated with one or more layers of primer is preferred.

All of the compositions and methods disclosed and claimed herein can be made and executed without undue experimentation in light of the present disclosure. While the compositions and methods of the present disclosure have been described in terms of preferred embodiments, it will be apparent to those of skill in the art that variations may be applied to the compositions and methods and in the steps or in the sequence of steps of the method described herein without departing from the concept, spirit, and scope of the invention. More specifically, it will be apparent that certain agents which are chemically related may be substituted for the agents described herein while the same or similar results would be achieved. All such similar substitutes and modifications apparent to those skilled in the art are deemed to be within the spirit, scope, and concept of the invention as defined by the appended claims.

EXAMPLES

The present invention is further defined in the following Examples. It should be understood that these Examples, while indicating preferred embodiments of the invention, are given by way of illustration only. From the above discussion and these Examples, one skilled in the art can ascertain the preferred features of this invention, and without departing from the spirit and scope thereof, can make various changes and modifications of the invention to adapt it to various uses and conditions.

Hardness (Fischer): Hardness was measured using a hardness tester available from Fischer Technology, Inc., Windsor, Conn. 06095. The measurement is in Newtons per square millimeter.

Gel Fraction is measured according to the procedure set forth in U.S. Pat. No. 6,221,494 col. 8 line 56 to col. 9 line 2 which procedure is hereby incorporated by reference.

The swell ratio of a free film (removed from a sheet of TPO—thermoplastic olefin) was determined by swelling the film in methylene chloride. The free film was placed between two layers of aluminum foil and using a LADD punch, a disc of about 3.5 mm in diameter was punched out of the film and the foil was removed from the film. The diameter of the unswollen film ($D_o$) was measured using a microscope with a 10× magnification and a filar lens. Four drops of methylene chloride were added to the film and the film was allowed to swell for a few second and then a glass slide was placed over the film and the swollen film diameter ($D_s$) was measured. The swell ratio was then calculated as follow: Swell Ratio=$(D_s)^2/(D_o)^2$.

Example 1

Synthesis of a Low Molecular Weight Oligomer

A mixture of 276 g of glycerol (3.0 mol) and 592 ml triethylorthoformate (3.5 mol) was kept for 30 min. at 100° C. in the presence of stripping ethanol. After the 30 min., all volatile chemicals were evaporated under 2 mm Hg vacuum at 60° C. for 30 min. to remove traces of ethanol. GPC analysis provided an $M_n$ of 280 with a monomer content of 37%.

A representative formula of the oligomer produced in this example is shown below. On average, n=1.3. An equivalent weight (EW) can be calculated with the following equation: EW=148+102n. When n=1.3, EW=282.

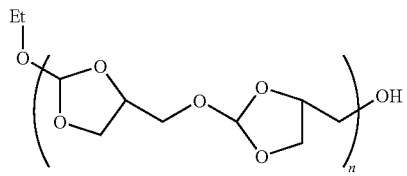

Example 2

Synthesis of a Higher Molecular Weight Oligomer

A mixture of 276 g of glycerol (3.0 mol) and 592 ml triethylorthoformate (3.5 mol) was kept for 75 min. at 140° C. in the presence of stripping ethanol. After the 75 min., all volatile chemicals were evaporated under 2 mm Hg vacuum at 60° C. for 30 min. to remove traces of ethanol. GPC analysis provided an $M_n$ of 440 with a monomer content of 19%.

Example 3

Synthesis of an Oligomer Using a Catalyst

Mixture of 276 g of glycerol (3.0 mol), 592 ml triethylorthoformate (3.5 mol), and 20 mg dodecylbenzenesulfonic acid was kept for 1 hr. at 21° C. After the 1 hr., the acid was neutralized using triethylamine, and all volatile chemicals were evaporated under 2 mm Hg vacuum at 60° C. for 30 min. to remove traces of ethanol. GPC analysis provided an $M_n$ of 245 with a monomer content of 43%.

Example 4

A coating composition was prepared by first reacting 12.87 g of the orthoformate oligomer prepared from Example 1 with 5.06 g of IPDI (isophorone diisocyanate) (Bayer Corp., Pittsburgh, Pa. 15205) in 11.0 g of butyl acetate as solvent and using 0.088 g of dibutyl tin dilaurate as catalyst. The reaction was conducted overnight at room temperature. In the second step, 6.78 g of the reaction product above was mixed with 9.95 g of hexamethylene diisocyanate trimer (Bayer Corp., Pittsburgh, Pa. 15205), 1.08 g of butyl acetate solvent and 0.25 g of dodecylsulfonic acid catalyst.

Two to three mil thick films of the coating composition above were cast by draw down on primed steel panels and TEDLAR® polyvinyl fluoride (PVF) film under the registered trademark of E. I. du Pont de Nemours and Company for crosslinking and property evaluation. After drawn down, the panels were allowed to flash at room temperature and then baked for 30 min. in an oven at 285° F. (140.6° C.). Films were hard smooth and clear.

Evaluation results are shown in Table 1.

TABLE 1

|  | Panels baked 30 min. at 285° F. (140.6° C.) | Panels after 30 days at RT |
|---|---|---|
| Gel Fraction | 99.8% | 95.6% |
| Swell Ratio | 1.49 | 1.48 |
| Fisher Hardness | 120 | 117 |

Example 5

Preparation of Orthoformate Protected Diglycerol

A mixture of 133 g of diglycerol (0.8 mol) (TCI America, 9211 N Harborgate Street, Portland Oreg. 97203) and 304 ml triethylorthoformate (1.8 mol) was kept for 80 min at 140° C. with stripping ethanol. Then all volatile chemicals were evaporated under 2 mm Hg vacuum at 60° C. for 60 min. to remove traces of ethanol. IR spectrum of the obtained orthoformate-protected diglycerol had no OH signal. GPC data indicates formation of oligomers Mn=440.

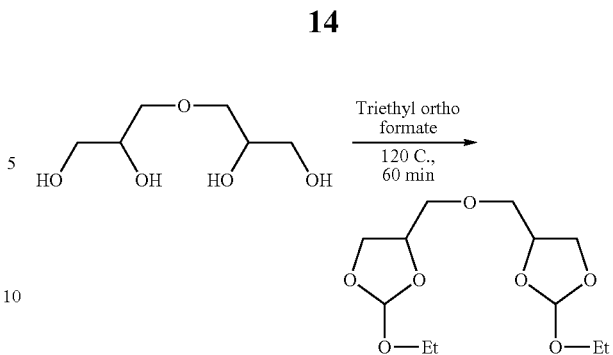

Example 6

A coating composition was prepared by first mixing 1.17 g of the orthoformate protected diglycerol produced in Example 5 with 2.34 g of hexamethylene diisocyanate trimer and 1.00 g of butyl acetate solvent. Then 0.10 g of dodecylsulfonic acid catalyst and 0.01 g of dibutyl tin dilaurate were added as catalysts. Approximately three mil thick films of the coating composition were cast by draw down on primed steel panels and TEDLAR® polyvinyl fluoride (PVF) for crosslinking and property evaluation. After drawn down, the panels were allowed to flash at room temperature and then baked for 30 min. in an oven at 285° F. (140.6° C.).

Evaluation results are shown in Table 2.

TABLE 2

| Panels baked 30 min. at 285° F. (140.6° C.) | |
|---|---|
| Gel Fraction | 95.1% |
| Swell Ratio | 1.72 |

Example 7

Orthoformate Protected Diglyceryl Ester of Perhydrophtalic Acid

A mixture of 96 g of diglyceryl ester of perhydrophtalic acid (0.3 mol) (Sigma-Aldrich, St. Louis, Mo. 63103) and 110 ml triethylorthoformate (0.65 mol), was kept for 60 min at 120° C. with stripping ethanol. Then all volatile chemicals were evaporate under 2 mm Hg vacuum at 60 C for 60 min to remove traces of ethanol. IR spectrum of the obtained orthoformate-protected diglyceryl ester of perhydrophtalic acid had no significant OH signal. GPC data indicates the formation of oligomers with Mn=610.

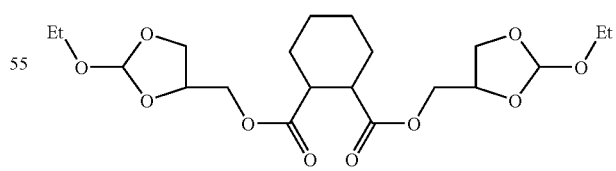

Example 8

A coating composition was prepared by first mixing 2.93 g of the orthoformate protected diglyceryl ester of perhydrophtalic acid produced in the Example 7 with 4.85 g of hexamethylene diisocyanate trimer and 1.25 g of butyl acetate solvent. Then 0.25 g of dodecylsulfonic acid catalyst and 0.025 g of dibutyl tin dilaurate were added as catalysts. Approximately three mil thick films of the coating composition were cast by drawdown on primed steel panels and TEDLAR® polyvinyl fluoride (PVF) for crosslinking and property evaluation. After drawn down, the panels were allowed to flash at room temperature for three hours and then baked for 60 min. in an oven at 60° C.

Evaluation results are shown in Table 3.

TABLE 3

| Panels baked 60 min. at 60° C. | |
|---|---|
| Gel Fraction | 93.3% |
| Swell Ratio | 1.59 |
| Fisher Hardness | 6 |

Example 9

A coating composition was prepared by first mixing 2.34 g of the orthoformate protected diglyceryl ester of perhydrophtalic acid produced in the Example 7 above was mixed with 3.10 g of hexamethylene diisocyanate trimer and 1.00 g of butyl acetate solvent. Then 0.24 g of dodecylsulfonic acid catalyst and 0.028 g of dibutyl tin dilaurate were added as catalysts. Approximately three mil thick films of the coating composition were cast by draw down on primed steel panels for crosslinking and property evaluation. After drawn down, the panels were allowed to flash at room temperature for three hours and then baked for 30 min. in an oven at 285° F. (140.6° C.).

Evaluation results are shown in Table 4.

TABLE 4

| Panels baked 30 min. at 285° F. (140.6° C.) | |
|---|---|
| Fisher Hardness | 79 |

Example 10

Orthoformate Protected Glyceryl Ester of Succinic Acid

A mixture of 129 g of glycerol (1.5 mol) and 50 g of succinic anhydride (0.5 mol) (Sigma-Aldrich, St. Louis, Mo. 63103) were kept at 210° C. for 90 min. The mixture was then chilled to 110° C. and vacuum was applied to remove traces of water. Then 253 ml triethylorthoformate (1.5 mol) was added and the mixture was kept at 110° C. for 60 min with stripping ethanol. Then all volatile chemicals were evaporate under 2 mm Hg vacuum at 60° C. for 60 min to remove traces of ethanol. IR spectrum of the obtained orthoformate-protected glyceryl ester of succinic acid had no significant OH signal. GPC data indicates formation of oligomers Mn=540.

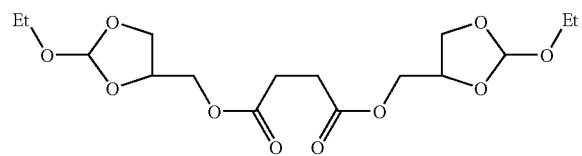

Example 11

A coating composition was prepared by first mixing 2.34 g of the orthoformate orthoformate-protected glyceryl ester of succinic acid produced in Example 10 above was mixed with 3.10 g of hexamethylene diisocyanate trimer and 1.00 g of butyl acetate solvent. Then 0.24 g of dodecylsulfonic acid catalyst and 0.028 g of dibutyl tin dilaurate were added as catalysts. Approximately three mil thick films of the coating composition were cast by drawn down on primed steel panels for crosslinking and property evaluation. After drawn down, the panels were allowed to flash at room temperature for three hours and then baked for 30 min. in an oven at 285° F. (140.6° C.).

Evaluation results are shown in Table 5.

TABLE 5

| Panels baked 30 min. at 285° F. (140.6° C.) | |
|---|---|
| Fisher Hardness | 5 (soft film) |

We claim:
1. A coating composition comprising:
(a) a blocked polyol of the formula:

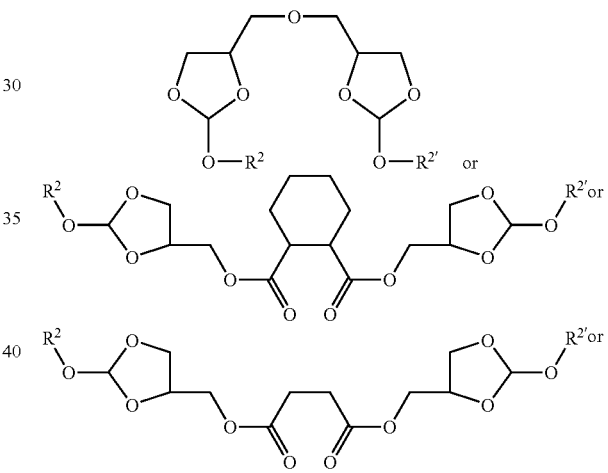

a combination thereof,
wherein $R^2$ or $R^{2'}$ is alkyl of 1 through 10 carbon atoms; and
(b) one or more polyisocyanate compounds;
wherein said blocked polyol is free from hydroxyl groups that are reactive with said one or more polyisocyanate compounds.

2. The coating composition of claim 1, wherein the one or more polyisocyanate compounds are present in a molar equivalent ratio of isocyanate groups in said one or more polyisocyanate compounds to hydroxyl groups in the blocked polyol in a range of from 0.5 to 2.0.

3. The coating composition of claim 1, further comprising a pigment, a filler, a solvent, a catalyst, a conventional additive, or a combination thereof.

4. The coating composition of claim 1, wherein the coating composition is a clearcoat composition, a pigmented coating composition, a basecoat composition, a monocoat composition, or a primer.

* * * * *